United States Patent
Erickson

[15] 3,703,990
[45] Nov. 28, 1972

[54] SPRINKLER IRRIGATION APPARATUS AND METHOD

[72] Inventor: Lennart G. Erickson, 2075 Pioneer Court, San Mateo, Calif. 94402

[22] Filed: March 18, 1971

[21] Appl. No.: 125,656

Related U.S. Application Data

[63] Continuation-in-part of Ser. No. 767,955, Oct. 16, 1968, Pat. No. 3,610,531, and a continuation-in-part of Ser. No. 815,596, April 14, 1969, Pat. No. 3,578,244.

[52] U.S. Cl. .................. 239/11, 137/344, 239/111, 239/177, 239/191
[51] Int. Cl. ..................................... B05b 3/18
[58] Field of Search....239/1, 11, 111, 191, 177, 212, 239/213; 92/132; 138/106; 137/344

[56] References Cited

UNITED STATES PATENTS

| | | | |
|---|---|---|---|
| 3,237,867 | 3/1966 | Hogg | 239/212 |
| 2,834,634 | 5/1958 | Johnson | 239/111 |
| 3,326,232 | 6/1967 | Stamps et al. | 239/212 X |
| 3,381,893 | 5/1968 | Smith, Jr. et al. | 239/212 X |
| 3,610,531 | 10/1971 | Erickson | 239/191 |
| 2,892,593 | 6/1959 | Smeltzer | 239/177 |

Primary Examiner—Lloyd L. King
Assistant Examiner—Michael Y. Mar
Attorney—Townsend and Townsend

[57] ABSTRACT

Apparatus and a method for sprinkler irrigation wherein a lateral for conveying water has a number of sprinkler heads at spaced locations along the same. Means is provided to cycle the fluid control valves for the heads so that the latter will deliver water in a sprinkling pattern intermittently. One form of the apparatus includes a flexible hose for connecting the lateral to any one of a number of hydrants along the length of a water main. This apparatus permits a relatively long field to be irrigated substantially uniformly in a given period of time. Another embodiment of the apparatus utilizes a flexible, self-emptying hose for connecting the lateral to a single source of water. The lateral can be supported from beneath by retractable means when it delivers water and it can be drained after waterflow therethrough has ceased. The lateral can be mounted on a carrier formed of pivotally interconnected unit which may be independently driven.

35 Claims, 19 Drawing Figures

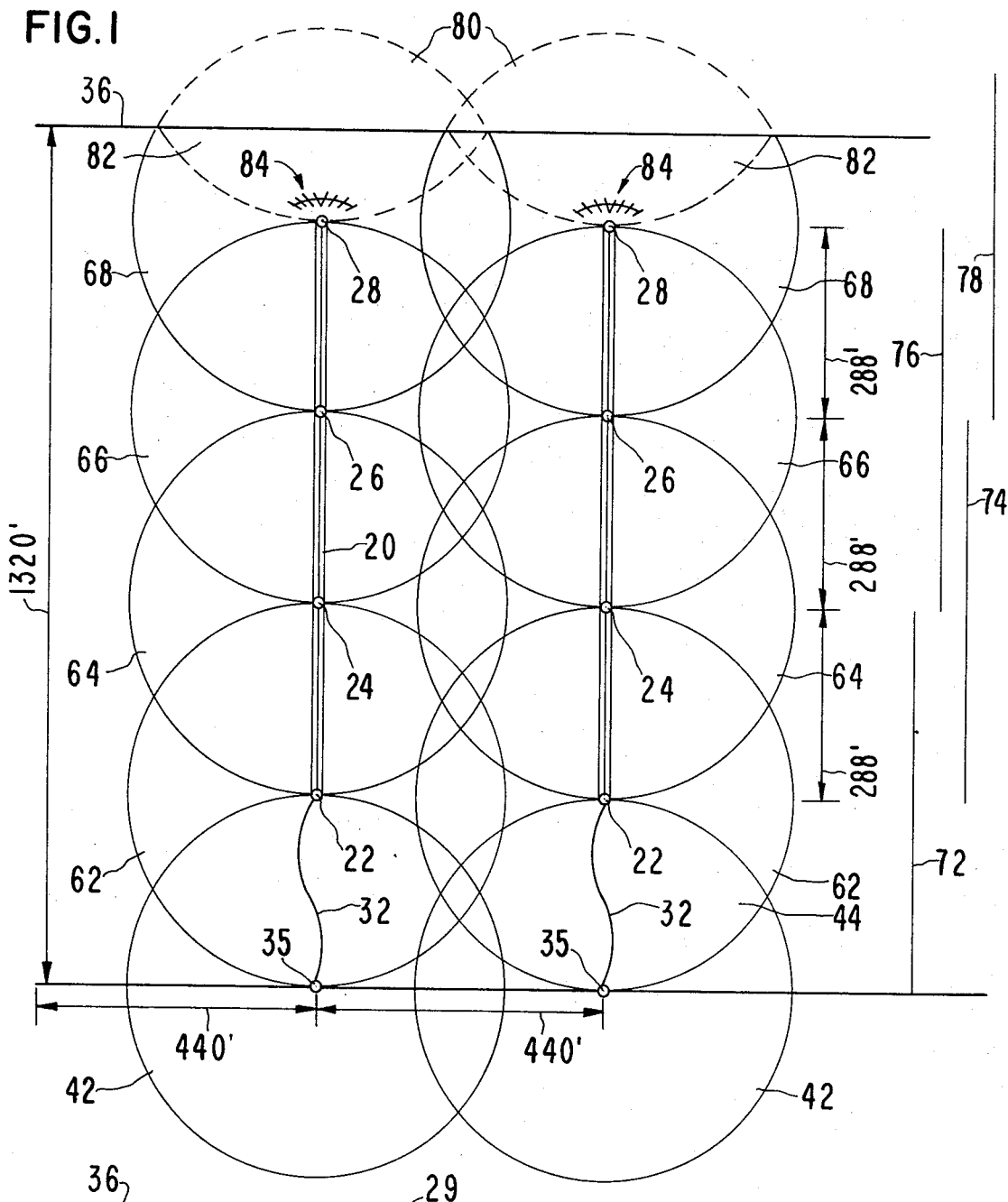
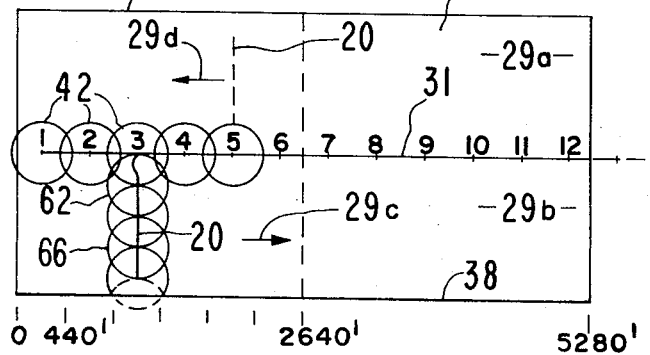

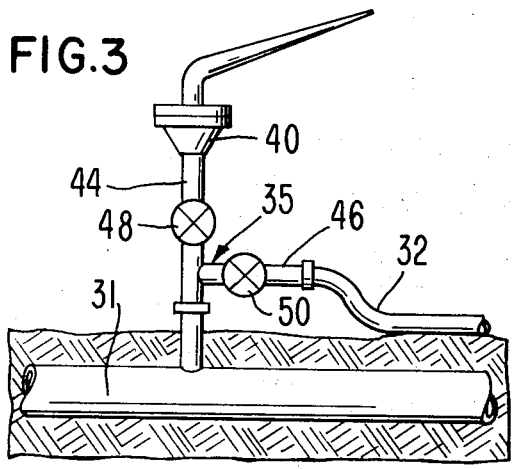
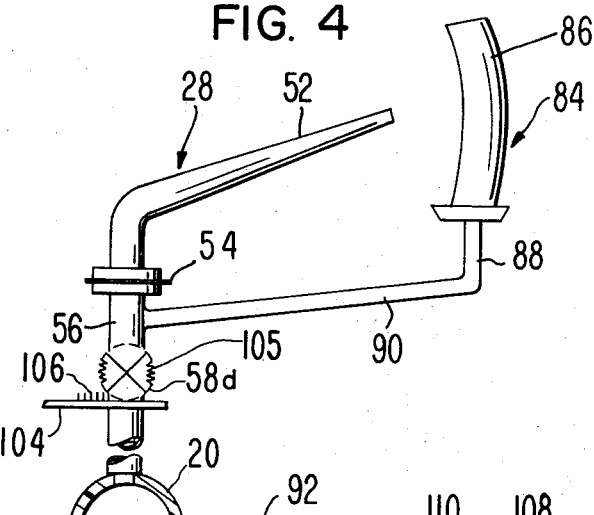
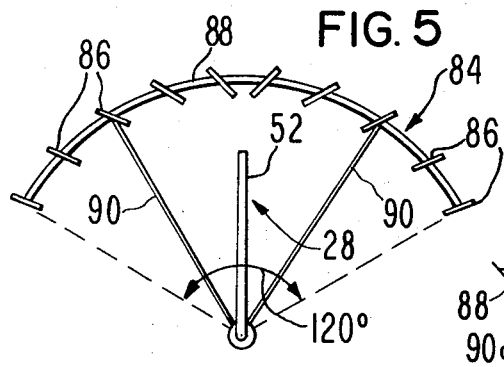
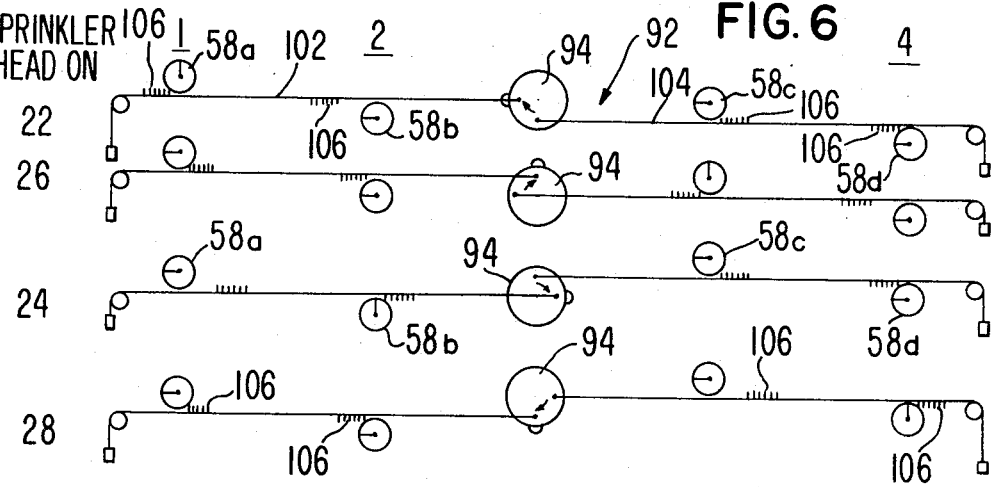
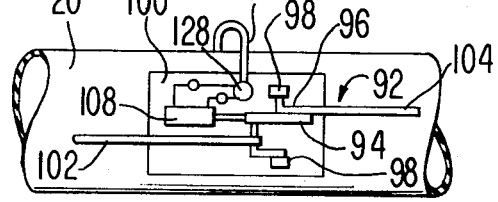

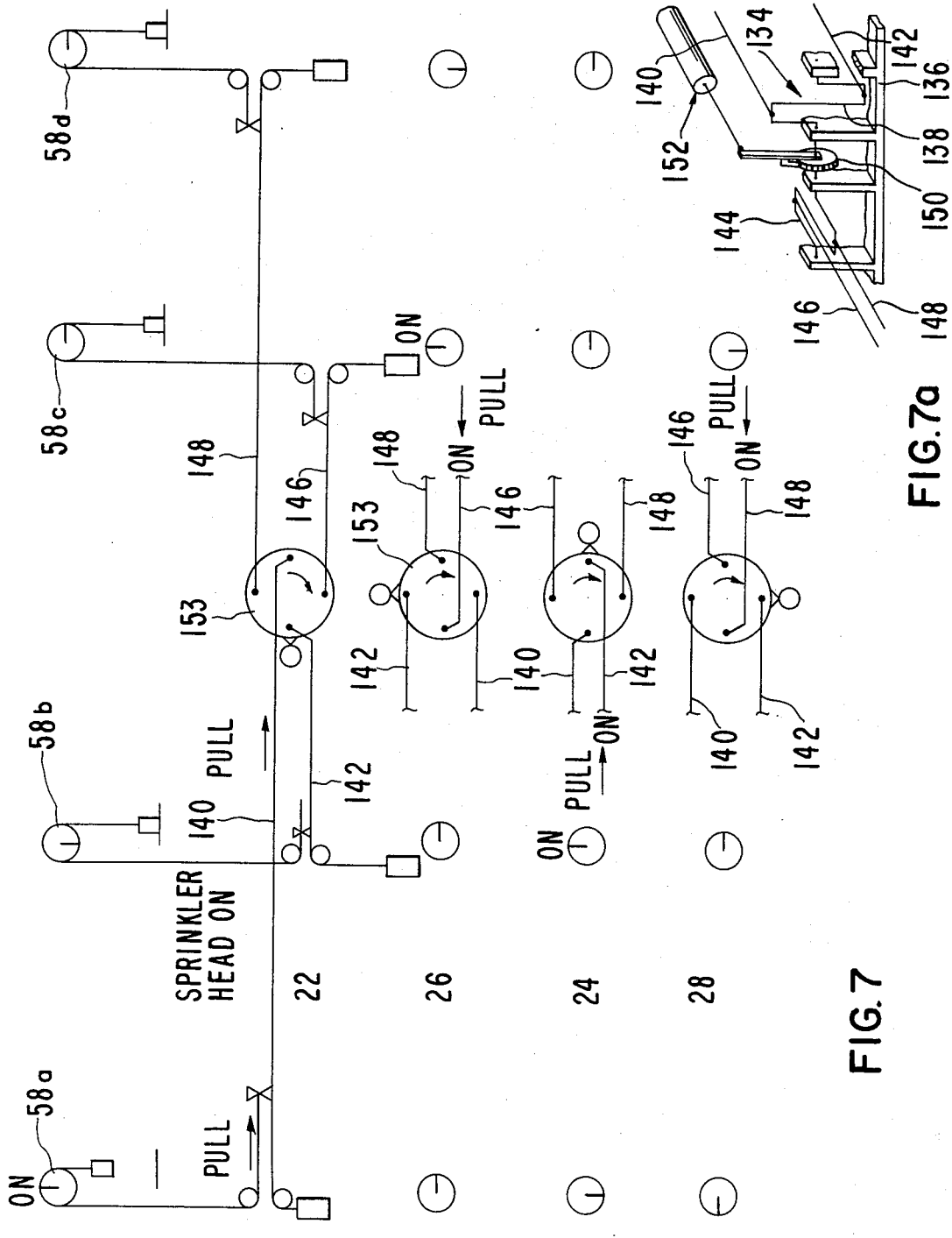

INVENTOR.
LENNART G. ERICKSON
BY
Townsend and Townsend
ATTORNEYS

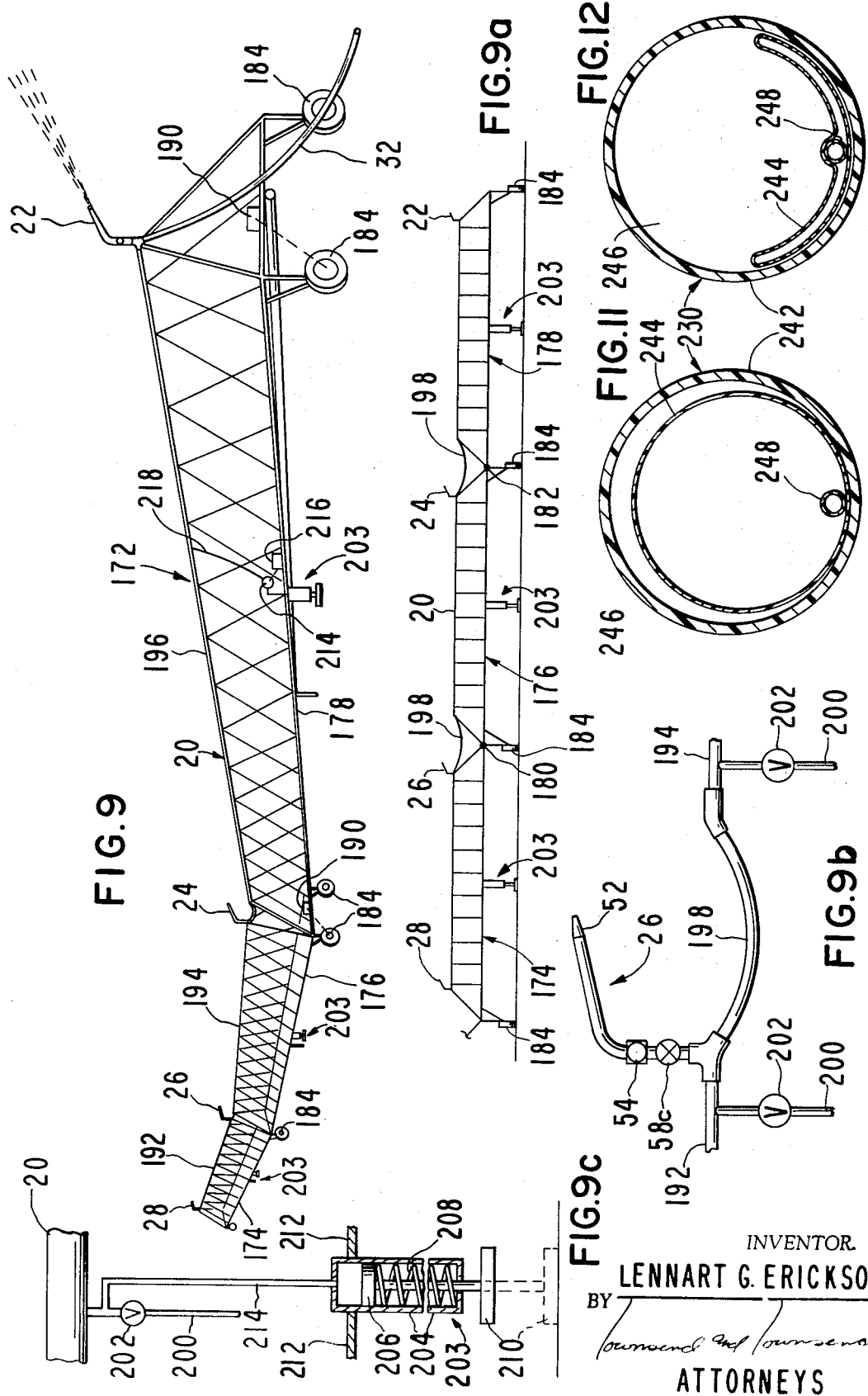

SPRINKLER IRRIGATION APPARATUS AND METHOD

This is a continuation-in-part application of copending U. S. applications Ser. No. 767,955, filed Oct. 16, 1968, now U.S. Pat. No. 3,610,531 and Ser. No. 815,596, filed Apr. 14, 1969 now U.S. Pat. No. 3,578,244.

This invention relates to improvements in irrigation techniques for relatively large fields and, more particularly, to apparatus and a method for irrigating a field with sprinkler heads which are sequentially actuated.

In application Ser. No. 767,955, a new concept of sprinkler irrigation was disclosed for relatively large fields, such concept relating to alternate cycle sprinkling of adjacent areas of a field using a timer controlled cycling valve to direct the total available flow of water alternately (typically 30-minutes-ON, 30-minutes-OFF) through either of two sprinkler lateral pipes, thence through multiple spaced sprinkler heads to irrigate adjoining field areas. Such total flow of water through a lateral during ON intervals allows use of sprinkler heads with larger bore nozzles, each capable of projecting water over larger radius circular areas of coverage, allowing an increased spacing of such sprinkler heads along the lateral. Thus, the area of land that can be irrigated without changing the physical position of the pair of laterals is substantially doubled as compared to the conventional arrangement wherein the available total flow of water is continuously divided between two sprinkler laterals and discharged continuously through relatively small sprinkler heads. The comparative improvements achieved in this cyclic irrigation system are: (1) substantial reduction in operating labor as each sprinkler lateral irrigates a larger land area and thus needs to be moved less frequently; (2) substantial reductions in flooding, water runoff wastage and soil erosion as under cyclic irrigation a given quantity of water is distributed over a larger land area, thus the rate of application per unit area per hour is substantially reduced; and (3) substantial increase in long term average rate of water infiltration into soils surfaces due to respiration effect of cyclic periods of water application interspersed with resting periods to facilitate percolation of water and air into the soils.

Improvements (2) and (3) set forth above allow practical realization of an improved cyclic irrigation system in which the total flow of water may be substantially increased, up to the capacity of the soils to absorb water thus applied according to this cyclic sprinkler irrigation method. Thus, substantial economies are achieved as compared to the amounts of equipment and labor required for distribution of comparable quantities of irrigation water over comparable land areas using conventional continuous sprinkler irrigation methods.

Other important aspects included in application Ser. No. 767,955 were the idea of retractably supporting a lateral from beneath to allow the lateral to be maintained above ground level while in operation and to facilitate movement thereof after automatically draining the lateral when fluid flow therethrough was stopped.

In application Ser. No. 815,596, an improved sprinkler irrigation apparatus and method were disclosed wherein cyclic operation of a number of spaced sprinkler heads was set forth, each head having a remotely controllable valve actuated in accordance with a predetermined sequence so that less than all the valves were actuated at any one given time, to accomplish the previously described benefits of cyclic irrigation but utilizing only one sprinkler lateral thus adapted for continuous flow of water therein during an irrigation period. A specific embodiment of electrically actuated control was also disclosed in the last-mentioned application.

A principal objective with respect to intermittent or cyclic irrigation was to develop techniques for economically irrigating large areas of improved landrange for increased forage, grains or feed crop production by supplementation of natural rainfall and thus to extend the cattle grazing season for a particular piece of land. Another objective was to develop improved sprinkler irrigation apparatus and methods suitable for use in the production of row crops and general field crops.

In recent years, in an effort to increase the carrying capacity of land areas, for beef cattle production, many installations of conventional sprinkler irrigation systems have been employed for irrigation of grass crops for grazing or for harvested feed production. Practically all such installations have been pivot type irrigators, typically including a continuously moving lateral pipeline approximately 1,250 feet in length and carrying many small continuously operating sprinkler heads coupled thereto, all arranged for irrigation of a circular area around a center pivot source of water and power. Such pivot irrigation systems are well-known in the art and typical equipment is described in the catalogs publications of W. R. Ames' Company, Milpitas, California, or Valmont Industries, Inc., Valley, Nebraska.

A typical installation of this type will irrigate approximately 130 acres of land in the center of a 160-acre rectangular tract. Also, such sprinkler equipment costs at least $20,000. The well, pump and power supply facilities generally increase total equipment costs to about $35,000. The fact that many such systems have been installed is a good indication of the profit potentials and incentivies in the beef cattle production industry. However, many operators consider that the economic returns from such an investment in only 130 acres or so is marginal and they are concerned about the 30 acres of corner land (over 15 percent of each 160-acre tract) that cannot be irrigated by a pivot system installation. Some attempts have been made to increase the irrigated area by "end-move" towing of the sprinkler system for alternate use at two pivot point water supply installations in two 160-acres tracts of land. However, such attempts have not proven to be practical. Moreover, some attempts have been made to develop a linearly movable system to provide for irrigation of rectangularly shaped fields but all such attempts have been directed to continuous systems. Designs resulting from this work have failed or operate under severe practical limitations due to the basic problem of supplying water to a moving lateral pipeline. If a typical 5-inch flexible connecting hose is used with the lateral, the total weight of the connecting hose with water in it is about 1,000 lbs./100 feet of length. This renders the connecting hose extremely difficult to drag behind a sprinkler lateral which requires continuous movement while irrigating.

The present invention is directed to apparatus and a method for sprinkler irrigation of relatively large fields of regular and irregular sizes wherein the irrigation is substantially uniform over large areas and can be accomplished with a minimum number of sprinkler heads and with a minimum amount of other support equipment. In the present invention, the various sprinkler heads are operated sequentially and controlled by structure which is carried on the lateral itself. Such structure can either be mechanically actuated in response to the fluid flow of water through the lateral or it can be electrically actuated in accordance with a program device. Since the sprinkler heads are operated sequentially, a moving pattern of sprinkler water distribution is accomplished without any movement of the lateral itself or of the lateral support structure of the connecting hose coupled to the lateral. If the heads have a capacity of approximately 1,000 gallons per minute, a relatively large area of land, such as 13 acres or more, can be irrigated during a particular irrigation shift or set. By distribution of the water over a uniquely large area, the lateral needs to be moved only once or twice a day. A unique advantage of utilizing the present invention is that any given land area is irrigated intermittently or cyclically, thereby resulting in an increase of about 30 percent in the average infiltration rate of the soil due to the resting intervals for soil absorption of water and air between intervals of water application. The 30 percent increase is relative to the average infiltration rate resulting from continuous sprinkling at the same average rate of water application during an irrigation set.

A unique advantage of the use of the present invention is that irrigation by sprinkling can be achieved such that the average rate of application of water to a land area is about 0.17 inches per hour, very close to the ideal rate of water application as determined by acknowledged irrigation experts, and generally much lower than for conventional sprinkler irrigation systems. Thus, the problems of runoff of water, wastage and erosion are practically eliminated and the field surface stays relatively dry and firm under irrigation. Moreover, potential impact damage from large droplets of water is eliminated through the use of adequate water pressure and adequate speed of rotation of the sprinkler heads as well as the use of a stream projection trajectory such that the water is dispersed into droplets about the same size as in any other sprinkler system using impact type sprinkler heads and in which free-fall terminal velocity is reached by most droplets.

A further advantage resulting from the use of the present invention is that repetitive cyclic irrigation of each unit area of soil during full duration of an irrigation set results in a relatively uniform distribution of water under wind conditions that ordinarily would prevent efficient operation of any conventional irrigation system using large sprinkler heads. This is achieved by alternate cyclic irrigation of most unit areas of soil from two sprinkler heads operating to project water from opposite directions. This is also due to long term, i.e., full set, averaging of the effects of periods of variable wind directions and intensities and calm periods.

Since the present invention is capable of using sprinkler heads having a capacity of 1,000 gallons per minute, the apparatus is suitable for the economical distribution of manure available as a by-product from nearby cattle feed lot operations. The animal waste products in processed slurry form can be injected by pressure pumping into a water main and then directed into the lateral of the invention for delivery by the sprinkler heads in accordance with a predetermined sequence. A sprinkler head having the relatively large capacity as set forth above will generally have a nozzle diameter of approximately 1.6 inches; thus, the head is not susceptible to clogging even by any solid material that may be suspended in the slurry. Thus, a feed lot disposal problem can be readily converted into an opportunity for very economical fertilization of the irrigated crops.

One form of the apparatus of the invention includes a lateral adapted to be releasably connected to any one of a number of fluid outlets on a water main which is coupled to a source of water under pressure. Such water main may be disposed in a fixed location in a field so that the lateral can progressively move over the field during a number of irrigation sets of predetermined duration. Also, this apparatus lends itself to moving the lateral alternately on opposite sides of the water main so that, for instance, a relatively large rectangular area of land, such as a 320-acre tract, can be irrigated in a certain period of time, such as 24 days or the like.

In connection with the foregoing embodiment, the sprinkling patterns of the sprinkler heads are best provided with circular distribution patterns and improved water deflection means can be employed with the lateral to deflect the water issuing from a specific sprinkler head onto predetermined portions of the soil. Thus, the apparatus permits "squaring the circle" or, more correctly, to square one side of the normally circular area of coverage of a sprinkler head to more evenly distribute the water along borders of a field.

Another aspect of the foregoing embodiment is that interim operation of a similar large capacity sprinkler head can be achieved by connecting the sprinkler head directly to the water main at the location at which the lateral is to be connected so that, during periods of time in which the lateral is shut down and is being moved to a new location, an area of the soil near the water main can be sprinkled. Thus, a uniform pattern of water coverage can be achieved along the center of the field if the water main is centrally disposed in the field itself. Also, the required overall length of the lateral is substantially reduced by using the head coupled directly to the water main. Also, continuous water-flow is maintained without loss of irrigating time or loss of time caused by shutting down and restarting the well pump.

A considerable cost saving feature of the present invention is that the mobile lateral can be drained of water prior to moving the same to the next operative location. Thus, the lateral can be of lighter weight construction and, because of such construction, less damage will be caused to the soil due to moving the lateral to the new location. Also, less power is required to move the lateral and there is less likelihood of the wheels of a carrier unit for the lateral from becoming bogged down in soft, wet soil.

A retractable support can be used with the carrier unit of the lateral to support the same midway between the ends thereof when water flows through the lateral.

Such a support can be operated in response to the fluid pressure within the lateral.

Another embodiment of the apparatus of the invention utilizes a relatively long, flexible, self-emptying hose for connecting the lateral to a single source of water under pressure. Such apparatus permits easily extended coverage of fields which are either regularly shaped or irregularly shaped. The self-emptying feature of the hose permits it to be readily drained prior to moving the lateral to a new location so as to minimize the weight of the system as well as to minimize any damage to the hose or to the growing crops in the field over which the hose is dragged.

The primary object of this invention is to provide improved apparatus and method for sprinkler irrigation of relatively large land areas wherein relatively large capacity sprinkler heads are sequentially actuated to intermittently deliver water in uniform distribution patterns to soil areas to increase the infiltration rate and to eliminate the problems associated with irrigation of land by the continuous sprinkling of water thereon.

Another object of this invention is to provide apparatus and a method of the type described wherein the invention is suitable for use in irrigating land areas of both regular and irregular shape and to provide uniform sprinkling of such areas notwithstanding the particular shapes thereof.

A further object of this invention is to provide sprinkler irrigation apparatus having means on a lateral for controlling the sequence of operation of various sprinkler heads on the lateral so that the apparatus is essentially self-contained and, with a source of water under pressure, defines an irrigation system which is more efficient and less expensive than conventional irrigation apparatus capable of irrigating the same land areas.

Other objects of this invention will become apparent as the following specification progresses, reference being had to the accompanying drawings for illustrations of several embodiments of the apparatus.

In the drawings:

FIG. 1 is a schematic, plan view of a portion of a field and the apparatus forming one embodiment of the present invention, illustrating the spray patterns of a number of sprinkler heads on a lateral disposed at two operative locations;

FIG. 2 is a schematic, plan view of an entire field capable of being irrigated with the apparatus, showing the main water line and illustrating the spray pattern of the sprinkler heads on the lateral and certain sprinkler heads coupled with respective hydrants along the main line;

FIG. 3 is an enlarged, side elevational view of a hydrant coupled with the main line;

FIG. 4 is an enlarged, fragmentary, side elevational view of a sprinkler head at one end of the lateral, showing a water deflector assembly for use in sprinkling an end boundary of a field;

FIG. 5 is a top plan view of the deflector assembly and sprinkler head of FIG. 4;

FIG. 6 is a schematic view of a mechanical valve actuation assembly responsive to fluid pressure in the lateral;

FIG. 6a is an enlarged, fragmentary, top plan view, partly schematic, of the lateral with the assembly of FIG. 6 mounted thereon to illustrate the way in which the valve actuation assembly is carried thereby;

FIG. 6b is a schematic view of the field actuated drive means for the assembly of FIG. 6;

FIG. 7 is a view similar to FIG. 6 but showing a second embodiment of the valve actuation assembly;

FIG. 7a is an enlarged, cross-sectional view of the drive means for the assembly of FIG. 7;

FIG. 9 is a perspective view of a mobile carrier comprised of three interconnected truss units adapted for use in supporting and moving the lateral of FIG. 1 over the ground;

FIG. 9a is a side elevational view of the carrier of FIG. 9;

FIG. 9b is an enlarged, fragmentary, side elevational view of a sprinkler head on the carrier of FIG. 9, showing the connection between the lateral sections on adjacent truss units;

FIG. 9c is a cross-sectional view of a support for a truss unit of FIG. 9;

FIG. 11 is an enlarged, cross-sectional view of the self-emptying hose of FIG. 10 in operating condition for carrying water therethrough to the lateral; and FIG. 12 is a view similar to FIG. 11 but illustrating the condition of the hose when it is collapsed to empty the same;

FIG. 5a is a schematic view of a second form of deflector assembly.

Figure 8:
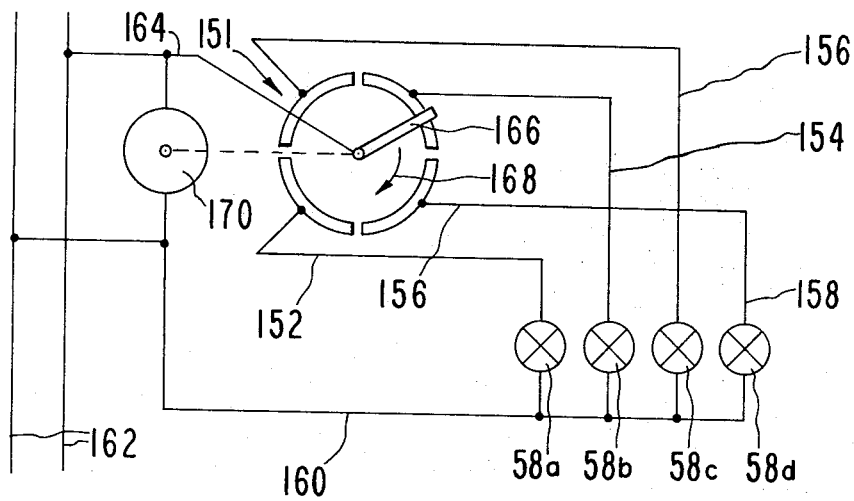
FIG. 8 is a schematic view of a third embodiment of a valve actuation assembly utilizing electrical circuitry.

The first embodiment of the irrigation apparatus of this invention is shown in FIG. 1 and includes a lateral 20 having four spaced sprinkler heads 22, 24, 26 and 28 thereon. Lateral 20 is adapted for use in irrigating a rectangular field 29 (FIG. 2) provided with a centrally disposed water main 31 in fluid communication with a well 33 which, for purposes of illustration only, is outside the confines of the field. Main 31 is provided with 12 hydrants 35 disposed at respective locations which, for simplicity, are numbered 1 through 12 in FIG. 2. Lateral 20 is substantially perpendicular to main 31 at all times and is releasably coupled to any one of the hydrants by a flexible hose 32. Following a sprinkling operation, the lateral is moved along the length of field 29, advancing from one operative location to the next and, at each such location, is coupled by hose 32 to a respective hydrant.

The apparatus of this invention is suitable for use in irrigating a 320-acre field which has a length of 5,280 feet and a width of 2,640 feet. Water main 31 substantially divides the field into two rectangular sections 29a and 29b and the various hydrants 35 are approximately 440 feet apart. With each sprinkler head on lateral 20 having a capacity of 1,000 gallons per minute and constructed so that water is sprinkled thereby in a circular pattern, lateral 20 can be of a length of 864 feet with the sprinkler heads thereon being spaced apart by a distance of approximately 288 feet. The diameter of the circular pattern of each of such sprinkler heads is approximately 600 feet when the water pressure in lateral 20 is approximately 130 psi. Typically, the water pressure at well 33 would be approximately 150 psi and the pressure at the input to lateral 20 would be about 140 psi. Lateral 20 moves, for instance, to the right in field section 29b and is then moved into field section 29a for movement to the left. Arrows 29c and 29d indicate the directions of movement of the lateral in field sections 29b and 29a, respectively. Since water main 31 is centrally disposed in field 29, it will be approximately 1,320 feet from the outer boundaries 36 and 38 of respective field sections 29a and 29b. Usually, water main 31 will be below ground level as shown in FIG. 3, or an above-surface installation could be employed.

Each hydrant 35 is of a type provided with two outlets so that it may be used alternately to supply lateral 20 or to supply a portable sprinkler head, including a quick-coupler device, 40 for sprinkling a circular pattern at the center of the field. Such a circular pattern is denoted by the numeral 42 in FIGS. 1 and 2. For purposes of illustration, FIG. 3 shows a hydrant 35 as having a T-fitting wherein one pipe segment 44 rises from water main 31 to provide a connection for portable sprinkler 40 and a lateral segment 46 is provided as a connection for one end of hose 32. Segments 44 and 46 have valves 48 and 50 for controlling the water flow therethrough. Alternatively, one three-way valve may be used instead of separate valves 48 and 50.

A portable sprinkler head, preferably of a type whose capacity is 1,000 gallons per minute operating at about 130 psi, may be conveniently coupled to any hydrant. At this capacity and pressure, the head is capable of covering a circular pattern 42, whose diameter is approximately 600 feet at an application rate of about 0.34 inches of water per hour. In this way, a land area of about 35 acres, or more than 11 percent of field 29, could be irrigated by use of a sprinkler head operated successively at the hydrant locations 1 through 12 along water main 31 without any lateral equipment.

The portable sprinkler heads and the four sprinkler heads installed on the lateral are preferably of the same construction and, for purposes of illustration, are of the type shown in FIG. 4 wherein each head includes a nozzle 52 mounted on a pivot 54 at the upper end of a riser pipe 56 having a valve 58 thereon. The nozzle continuously rotates about the longitudinal axis of pipe 56 during the corresponding sprinkling interval so that the sprinkling pattern thereof is circular. The sprinkling patterns for heads 22, 24, 26 and 28 are denoted by the numerals 62, 64, 66 and 68, respectively (FIGS. 1 and 2). When the lateral is at any one of its operative locations, the sprinkling patterns of adjacent heads overlap with each other. Also, the sprinkling patterns resulting when the lateral is at one operative location overlap with corresponding sprinkling patterns resulting when the lateral is at the next adjacent operative location.

Only one head is used at any one time. Means hereinafter described is used for cycling the heads on the lateral in accordance with a predetermined sequence. A typical sequence is illustrated by the vertical lines 72, 74, 76 and 78 corresponding to heads 22, 24, 26 and 28, respectively, such lines indicating that head 22 operates first, then head 26, then head 24, and finally head 28.

The field edge areas near the outer side boundaries 36 and 38 will receive only about half of the desired application of water as these areas are reached only by water distributed by sprinkler head 28. Also, a substantial amount of water from head 28 would be projected outside field 29 across the adjacent outer side boundary and into a crescent-shaped area denoted in dashed lines by the numeral 80 (FIG. 1). If such water falling in area 80 could be folded back into the crescent-shaped area 82 (the mirror image of area 80), then area 82 would receive a volume of water about the equivalent to the desired amount, which, for purposes of illustration is approximately 1.78 inches during a 10 ½ hour irrigation period. This folding back of the water into area 82 can be achieved by the use of a water deflection assembly 84 which is constructed to deflect the water stream from the adjacent nozzle 52 of head 28 into area 82 rather than allow such water to pass into area 80.

Assembly 84 is comprised of a number of circumferentially spaced deflector plates 86 which are interconnected by an arcuate bar 88 (FIGS. 4 and 5) and coupled by a pair of angularly disposed braces 90 to the adjacent riser pipe 56, the latter being essentially at the apex of the arc of bar 88. Bar 88 intercepts an arc of approximately 120° of the circular water pattern of sprinkler head 28 (FIGS. 1 and 5). The various deflector plates 86 can be carefully shaped according to hydraulic engineering principles so as to cleanly divide and deflect the stream of water issuing from head 28 to secure a uniform dispersion of water over the desired area and without excess close-in concentration of water due to splatter dissipation. As shown in FIG. 5, deflector plates 86 are angularly disposed relative to the water trajectory, the angles of the plates near the outer extremities of bar 88 being relatively small where full range projection of the water from adjacent head 28 is required and the angles increasing for the plates as the central portion of bar 88 is approached. Means (not shown) is also provided to render each plate adjustable as to angle. Also, each plate can be curved, as shown in FIG. 5, to provide for effective deflection of the water stream from head 28.

FIG. 5a, shown in schematic form, illustrates a second form of the deflector assembly wherein a straight-line rack of angularly disposed, adjustable deflector plates 86a are secured to a straight bar 88a. Braces 90a secure bar 88a to the riser pipe of head 28. Plates 86a are oriented to deflect the water for the same purpose as described above with respect to plates 86.

The concept of deflecting the water with deflector plates is especially important in cyclic sprinkler irrigation using relatively large capacity sprinkler heads because it controls the rate of application and the area of coverage as needed so as to conform to straight-line field boundaries. Therefore, it overcomes the deficiencies of conventional equipment which are not able to uniformly irrigate and sprinkle edge areas of fields because of the circular area of coverage of such conventional equipment.

The operating procedure for the irrigation of field 29 is as follows:

Lateral 20 is first operated on field section 29b. Assuming that the lateral is coupled to the hydrant at operative location 1, the heads are cycled according to the aforesaid sequence for a 10 ½ hour set, during which time the heads apply approximately 1.78 inches of water to most of the approximately 12-acre area defined by sprinkling patterns 62, 64, 66 and 68.

Upon completion of the first 10 ½ hour set, the operator turns on the water flow to a portable sprinkler head 40 coupled at hydrant location 3 on water main 31 by turning on the corresponding valve 48 (FIG. 3). Then, the operator shuts off the water flow to the lateral and moves it to location 2. Approximately 45 minutes after turning on water flow to head 40 at location 3, water flow to another portable head 40 at location 1 is turned on, following which water flow to head 40 at location 3 is turned off. Approximately 45 minutes after head 40 at location 1 is turned on, water flow to lateral 20 is turned on and sprinkling from the lateral commences, following which water flow to head 40 at location 1 is turned off. The heads on the lateral are then cycled for a 10 ½ hour set as before. Upon completion of the second 10 ½ hour set, a portable head 40 at location 4 is turned on, following which the lateral is shut down and moved to location 3. Approximately 45 minutes after head 40 at location 4 is turned on, a portable head 40 at location 2 is turned on, following which head 40 at location 4 is turned off. After head 40 at location 2 has been on about 45 minutes, lateral 20 is turned on and then head 40 at location 2 is turned off. This sequence of steps continues for the other hydrant locations when lateral 20 is in field section 29b, following which the lateral is moved into field section 29a and the latter is traversed by moving the lateral and the portable sprinkler heads in the opposite direction.

During the series of 24 10 ½ hour moves required for a 12-day full circuit of the 320-acre field, a portable sprinkler head 40 will be in operation at each hydrant location for two 45-minute periods when the lateral is progressing in one direction plus two 45-minute periods when the lateral is progressing in the opposite direction. During this total of three hours (at 0.34 inches per hour) a total of 1.02 inches of water will be delivered to each semi-circular area on the corresponding side of the water main, plus the 0.89 inches applied by way of the end sprinkler head 22 to make a total of approximately 1.91 inches which is only slightly greater than the 1.78 inches average irrigation applied by heads 22–28 to the field upon completion of the 24-set round trip in 12 days.

In the foregoing sequence, continuous water flow is maintained, i.e., water flow from main 31 is not shut down at any time. Therefore, there will be no excess pressure buildup in main 31, such as may occur when water flow is reduced, nor is it necessary to shut down and restart the well pump incident to such shutdown periods to permit excess pressure buildup. Equally important, there is no loss of irrigating time during periods while the lateral is shut down incident to a change in location.

One embodiment of the means for causing the heads to cycle is shown in FIGS. 6, 6a and 6b and includes a hydraulically actuated mechanical system 92 having a rotatable member which, while in practice, may be a crankshaft or the like, is shown symbolically as a disk 94 mounted on a shaft 96 (FIG. 6a) for rotation relative to a support 100 by a pair of bearings 98 mounted on the support, the latter being secured in any suitable manner to the structure of lateral 20 (FIG. 6a) near the central portion thereof.

A pair of rods 102 and 104 are pivotally coupled to disk 94 at locations thereon radially spaced 90° outwardly from shaft 96 as shown in FIG. 6. Rod 102 is adapted to operate the valves associated with heads 22 and 24 and rod 104 is adapted to operate the valves of heads 26 and 28. For purposes of illustration, the valves for heads 22, 24, 26 and 28 are denoted by the numerals 58a, 58b, 58c and 58d, respectively. Each valve has a rotatable gear or pinion member 105 (FIG. 4) which is disposed for meshing with a specific rack 106 on the corresponding rod. The racks are at certain locations to cause 90° rotation of the corresponding gear members 105 in accordance with the rotation of disk 94 about the axis of shaft 96. The ends of the rod 102 and 104 are shown as being provided with counterweights to bias the same outwardly of disk 94.

FIG. 6 also shows the sequence of operation of the various heads. For instance, the topmost view of FIG. 6 indicates that head 22 is on while the other heads are off. The second view of FIG. 6 indicates that head 26 is on while the other heads are off. The third view indicates that only head 24 is on, and the fourth view indicates that only head 28 is on. FIG. 4 shows rod 106 coupled to valve 58d for actuating and deactuating the same. This sequence corresponds to the vertical lines shown at the right in FIG. 1. The foregoing sequence of operation is achieved by rotating disk 94 through a single revolution. It is to be pointed out that FIG. 6 is merely schematic and variations in the connection between disk 94 and rods 102 and 104 may be made, if desired.

A means for rotating the disk is shown in FIG. 6b and includes a double-acting cylinder 108 having a piston 110 therein coupled to a rod 112 having a rack 114 which meshes with the gear teeth 116 on the outer periphery of disk 94 only during one direction of travel of piston 110, gear teeth 116 being shown only in FIG. 6b. A detent 118 biased toward disk 94 by a spring 120 is receivable within any one of four recesses 122 in the outer periphery of disk 94. The four recesses 122 correspond to respective operative positions of the disk shown in FIG. 6.

Water pressure from lateral 20 operates to move piston 110 in cylinder 108 through the use of separate flow control valves 124 and 126 which control the flow of water to respective, opposite ends of the cylinder. Valve 124 operates to obtain a relatively fast, i.e., 15 seconds, power stroke and valve 126 provides a relatively slow, i.e., 15 minutes, reset stroke. At each power stroke, disk 94 is rotated through an arcuate distance of 90°. Water flow to valves 124 and 126 is controlled by a three-way valve 128 which is provided with a snap action and is cam operated. Line 130 couples valve 128 with lateral 20. In operation, system 92 assures that the valve of each of the heads 22–28 is on approximately 25 percent of the total time for one revolution of disk 94 or for four strokes of piston 110. Speed of operation is simply controlled by valves 124 and 126 which control water flow to cylinder 108.

Another embodiment of the means for cycling heads 22–28 includes the hydraulically actuated mechanical system 132 (FIGS. 7 and 7a) using a crankshaft 134 rotatably mounted by bearings on a support 136 which is adapted to be carried by lateral 20 in any suitable manner. Crankshaft 134 has a first section 138 to which cables or rods 140 and 142 are coupled. The crankshaft has a second section 144 which is in a plane substantially perpendicular to the plane of section 138 but is movable therewith. A pair of cables or rods 146 and 148 are coupled to second section 144 and extend in a direction opposite to the direction in which cables 140 and 142 extend. A ratchet 150 mounted on the crankshaft between sections 138 and 144 is operated by a piston and cylinder assembly of substantially the same construction as that shown in FIG. 6b. Such assembly is broadly denoted by the numeral 152 and is hydraulically actuated by virtue of its being coupled to lateral 20 and having flow control valves of substantially the same construction as valves 124 and 126. Thus, for a power stroke of the piston of the assembly, ratchet 150 operates to rotate crank 134 through an arcuate distance of 90°. Thus, the planes of crankshaft sections 138 and 144 progressively rotate through angles of 90°.

Cables 140 and 142 are coupled to valves 58a and 58b, respectively (FIG. 7), which valves control the flow to respective heads 22 and 24. Similarly, cables 146 and 148 are coupled with valves 58c and 58d, respectively, the latter two valves corresponding to heads 26 and 28. Crankshaft 134 is represented by a disk 153 in FIG. 7 for purposes of illustration only. Also, for purposes of illustration only, each cable branches out into two end segments, one segment being coupled to the corresponding valve and both such segments having predetermined counterweights thereon to assure a predetermined tension in the corresponding cable. The valve is turned on and off by virtue of the frictional connection between the rotating member on the valve and the corresponding cable, or chain and sprocket connection.

In the upper view of FIG. 7, valve 58a is on while the other three valves are off. Thus, head 22 can then operate to sprinkle water within the corresponding sprinkling pattern. In the second view of FIG. 7, only valve 58c is on so that the corresponding head 26 is delivering water. In the third view, only valve 58b is on; thus, head 24 is in operation. Finally, in the last view of FIG. 7, only valve 58d is on so that head 28 is delivering water.

The embodiment of FIGS. 7 and 7a, like the embodiment of FIGS. 6, 6a and 6b is secured in any suitable manner to lateral 20 for movement therewith. Generally, it will be carried near the center of the lateral so that cables 140 and 142 can extend in one direction and cables 146 and 148 can extend in the opposite direction.

A hydraulically actuated mechanical system is preferred since such systems are generally more easily maintained inasmuch as agricultural personnel generally understand mechanical systems better than they do electrical systems. However, an electrical system of the type shown in FIG. 8 may be used to cycle the heads. Such system is carried on lateral 20 and includes four solenoid actuated valves 58a, 58b, 58c and 58d corresponding to head 22, 24, 26 and 28, respectively. A program device 151 includes a commutator ring having four segments which are out of electrical contact with each other. The segments are coupled by respective leads 152, 154, 156 and 158 to valves 58a, 58b, 58c and 58d, respectively. A common lead 160 couples the valves to one side of an electrical power source defined by a pair of power leads 162. The other side of the power source is coupled by a lead 164 to the movable arm 166 of the commutator, arm 166 being rotatable in the direction of arrow 168 under the influence of a motor 170 which is coupled across power leads 162. When arm 166 makes electrical contact with a particular segment, the corresponding valve is opened so that the head coupled with the valve permits sprinkling of water. In effect, therefore, the commutator ring provides an electrical switch which periodically operates to successively connect the electrical power leads 162 with the individual valves 58a, 58c, 58b and 58d, thus causing the heads to operate in the sequence shown by vertical lines 72, 74, 76 and 78 in FIG. 1. Other types of timer program devices could be used such as, for instance, a group of four switches, operated sequentially by means of a a four-lobe cam, four individual cams, or a solid state control device.

Prior mention has been made of pivot sprinkler irrigation systems well-known in the art. The movable lateral pipe carrier apparatus of any such equipment may be adapted for use in supporting and moving the improved cyclic sprinkler irrigation lateral 20 as described in this disclosure to achieve a fully mobile system capable of irrigation of much larger land areas. FIGS. 9 and 9a illustrate one such pipe carrier apparatus adapted to the purposes of the present invention. The carrier is broadly denoted by the numeral 172 and is comprised of three, end-to-end truss units 174, 176 and 178. Units 174 and 176 are pivotally interconnected by pivot means 180, and units 176 and 178 are pivotally interconnected by pivot means 182 (FIG. 9a). The two pivot locations permit the unit to compensate for undulating terrain.

Each truss unit is comprised of a transversely triangular, open framework which is supported at the opposite ends thereof by a pair of wheels 184. Only a single pair of wheels support the junction between units 174 and 176 and a single pair of wheels support the junction between units 176 and 178. Each of the four-wheel assemblies have a reversible motor 190 which is controllable independently of the motors of the other wheel assemblies. A suitable control means (not shown) can be used to control each motor, such control means being carried by carrier 172 at any suitable location thereon. For purposes of illustration, FIG. 9 illustrates a pair of motors 190 and shows the connection of these motors to their respective wheel assemblies by dashed lines.

Carrier 172 may also be provided with automatic alignment control equipment at the two pivot points to guard against excess misalignment. In effect, therefore, carrier 172 defines a self-powered machine similar to a large tractor and one which can be easily steerable to move forwardly or backwardly or to change direction by moving in an arc.

Lateral 20 is carried on carrier 172 adjacent to the upper margin thereof. Lateral 20 is divided into three pipes 192, 194 and 196 which are arranged in end-to-end relationship. A short, flexible hose 198 interconnects the proximal ends of adjacent pipes of lateral 20 as shown in FIG. 9b. The flexibility of hoses 198 permits the truss units to pivot relative to each other.

Also, FIG. 9b illustrates how pipes 192, 194 and 196 can be drained to minimize the weight of carrier 172. Generally, these pipes will be automatically drained of water at the end of each 10 ½ hour set and prior to the movement of carrier 172 to the next location. Each of such pipes has one or more valves 202 which may suitably be of the spring-loaded automatic drain type known in the art. Thus, when waterflow through lateral 20 is cut off, the various valves 202 will automatically open and allow water in pipes 192, 194 and 196 to be emptied of water. Each drain valve may discharge into a trailing, perforated hose 200 extended to the ground surface to disperse water drained from lateral 20.

FIGS. 9, 9a and 9c illustrate mid-span supports 203 for the three truss units, such supports being retractable and being of the construction shown in FIG. 9c. Each such support includes a cylinder 204 having a piston 206 therein which is spring-biased by a spring 208 in a direction to move the ground-engaging pad 210 thereof upwardly and out of engagement with the ground beneath the respective truss unit. Cylinder 204 has extensions 212 for securing the same to the respective truss unit. A hose 214 is provided to connect the upper end of the cylinder to lateral 20 so that the latter will be the source of fluid for forcing the piston downwardly so as to move pad 210 into engagement with the ground automatically during sprinkler irrigation operations when lateral 20 is filled with high pressure water. A mid-span automatic drain valve 202 and drain hose 200 may be provided to facilitate drainage of lateral 20 upon completion of the irrigation set. In response to the decrease in water pressure, pad 210 will automatically retract and remain clear of the ground surface while the lateral is being moved. Thus, the assembly of FIG. 9c will provide a mid-span support for the corresponding truss unit to compensate for the weight of water carried during irrigation operations.

In the alternative, the mid-span supports could be operated from an auxiliary source of electrical or hydraulic power so that they could be retracted or extended while lateral 20 is empty. This would avoid any stress due to lack of support for the truss units during transition intervals while the water pressure in the lateral is low but while the lateral is still practially full of water.

Carrier 172 is provided with an engine-driven alternator (not shown) or equivalent source of electrical power. The engine can be gasoline powered or, in lieu of an alternator, an engine-driven, hydraulic or air power generator could be provided.

Each truss unit is preferably about 250 to 288 feet long if lateral 20 thereon is adapted for operation at 1,000 gallons per minute or more, with large capacity sprinkler heads as herein described. Alternative mobile pipe carrier structure and apparatus may be used for transport of lateral 20, for instance, relatively simple short span apparatus is available from several manufacturers of pivot sprinkler irrigation systems; however, this will require use of additional intermediate powered wheel carrier units as such apparatus is typically designed for supporting pipe spans of about 90 to 140 feet between mobile supporting units.

The mid-span supports provide an economical design for the various truss units inasmuch as they need not be designed to carry the full weight of water. Generally, lateral 20 would have a diameter of about 7 inches. As shown in FIG. 9, the mid-span supports 203 are in their retracted positions. In FIG. 9a, such supports are in their extending, ground-engaging positions.

As further shown in FIG. 9, connecting hose 32 extends outwardly from truss unit 178 for connection to a hydrant on water main 31. To facilitate the movement of hose 32 when carrier 172 moves to the next operative location, the carrier can be provided with a motor-driven cable winch so as to permit reeling in and reeling out of hose 32. The cable of the winch can be extended to a deadman block at a hydrant location so as to winch hose 32 out into operating position after carrier 172 has moved to a new operative location.

Figure 10:
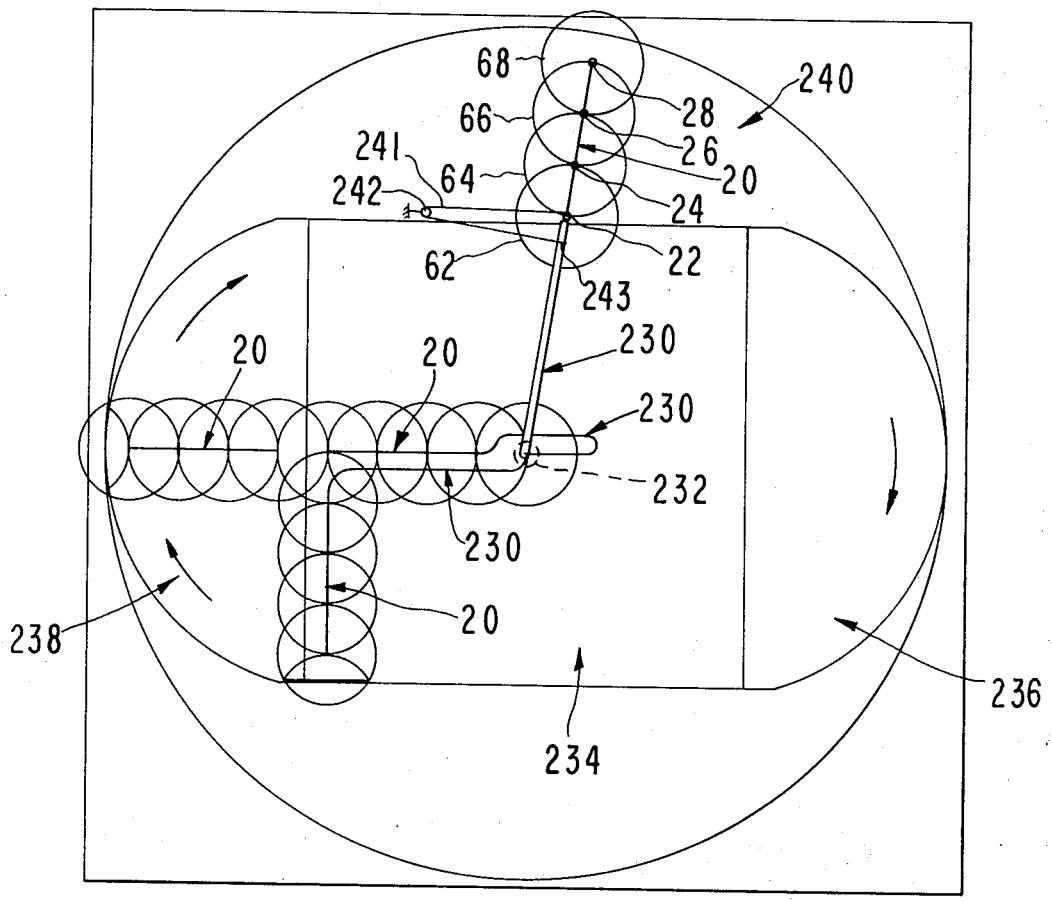
FIG. 10 is a schematic, top plan view of another embodiment of the apparatus of this invention in use in a field and utilizing a self-emptying hose for connecting the lateral to a single water source.

FIG. 10 illustrates another form of the apparatus of this invention utilizing a self-emptying hose 230 for connecting lateral 20 to a single source of water 232, such source being a well or the like provided with pump means for directing water under pressure into hose 230. Lateral 20 is substantially of the same construction as that shown with respect to the foregoing embodiments wherein four heads 22, 24, 26 and 28 are provided on the lateral to cause circular sprinkling patterns 62, 64, 66 and 68, respectively. Also, lateral 20 is carried by a carrier unit 172 and is provided with actuating means of any one of the three types shown in FIGS. 6, 7 and 8 for actuating the valves of the sprinkler heads in accordance with a predetermined sequence, such as the sequence indicated by vertical lines 72, 74, 76 and 78 of FIG. 1. The carrier unit for lateral 20 is provided with power means thereon so that the lateral can be moved in any one of a number of operative locations relative to water source 232. The flexibility of hose 230 permits a wide latitude in the placement of the lateral. Preferably, the hose is approximately 1,350 feet long; thus, the system of FIG. 10 creates extremely high flexibility in the irrigation of fields of different sizes, including irregularly shaped fields. FIG. 10 indicates several field shapes that can be readily utilized with the apparatus of the second embodiment. For instance, the apparatus can be used to irrigate a 160-acre square field 234 which is symmetrical with respect to source 232. Also, the apparatus can be used to irrigate a 285-acre oval shaped area defined by the square area 234 plus the arcuate areas 236 and 238. Furthermore, the apparatus can be used to irrigate a 450-acre circular area 240 surrounding the square and oval areas in FIG. 10. The apparatus can be used to irrigate fields of other sizes as well.

Hose 230 may be of self-emptying construction of the type shown in pending U. S. application Ser. No. 776,501, entitled, "SELF-EMPTYING HOSE," filed Nov. 18, 1968, wherein the hose has an outer tubular portion 242 and an inner tubular portion 244. Portion 244 functions as a conventional flexible hose and carries the flow of water from source 232 to lateral 20. Air or gas is contained under relatively low pressure in space 246 between tubular portions 242 and 244. When the flow of water under relatively high pressure in portion 244 has stopped, the gas pressure in space 246 causes portion 244 to collapse and thereby cause water therein to be forced out of the same. FIG. 11 shows portion 244 expanded and FIG. 12 shows portion 244 collapsed. A perforated tube 248 can be provided to define a secondary fluid path to avoid incomplete emptying of areas in portion 244 that might become isolated during the collapse of the latter. The water drained from portion 244 can flow either into lateral 20 for discharge therefrom and may drain also at the water source 232 end of the hose.

In use, hose 230 always remains coupled to the water source and to the lateral. The water flow to hose 230 is controlled, for instance, by turning a well pump on or off. The flow of water is stopped and hose 230 and lateral 20 are emptied when it is desired to move the lateral to a new operative location. Lateral 20 can be emptied with the use of the valves similar to valves 202 of FIG. 9b. When the lateral is in the new operative location, the water flow can again be commenced thereto.

Hose 230 retains its tubular shape when empty due to the internal gas pressure within space 246. This allows the hose to slide or roll more easily over the ground and over any minor obstructions without causing damage to the hose or to the growing crops in the field. Also, the hose may be provided with a number of sections, with the section couplings being freely rotatable to facilitate rolling and to equalize abrasion of the hose surface.

In some cases, the drag weight of the empty hose may be too great to be moved within the limitations of power of motor 190 and traction power of wheels 184 of FIG. 9. As described previously, the carrier 172 can be provided with an auxiliary motor-driven winch and cable to facilitate moving the hose. In FIG. 10, such a power operated cable 241 is shown extended through a deadman block pulley 242 to a tow-hitch coupling 243 near the end of hose 230. The hose may drain slowly inasmuch as the inner tubular portions 244 at the ends of the hose may constrict prior to complete construction of the central portion thereof. This is overcome by constructing the hose in several sections and using gradually lower gas pressure in spaces 246 in the hose sections toward the draining end or ends, thus insuring that draining water will be expelled progressively from the center of the hose towards the ends.

The apparatus of FIG. 10 would be most suitable for use in irrigation of grass fields for grazing cattle, as such crops would not suffer much damage from dragging hose 230 over the field. This is, however, a very important application of the present invention because the objectives in growing such forage crops is to irrigate large areas with an absolute minimal amount of labor and equipment and every cost savings technology has tremendous potentials in the basic industry of beef production.

In the alternative, hose 230 could be divided into two hose sections, each having a length of 660 feet. Each section could be retracted on a reel, one reel being located adjacent to source 232 and the other reel being carried by the lateral, such as on the carrier unit thereof. Such equipment is commercially available and would require only a conventional type hose inasmuch as water is drained in the retracting operation. Alternatively, hose 230 could be of conventional construction and air pressure from a source of supply at one end of the hose could be used to expel the water therefrom, as is well-known in the art.

Among the advantages of the use of the apparatus of FIG. 10 is the realization of capital cost savings due to eliminating the numerous hydrants on a water main, the realization of operating cost savings due to elimination of pressure losses from turbulence and abrupt changes in flow directions at hydrant connections; and realization of operational cost savings as the entire system is portable and can be moved from field to field as needed as well as being adaptable to irregularly shaped fields.

The apparatus described herein is suitable for use with sprinkler heads having a 1,000-gallon per minute capacity. The apparatus may also be adapted for use with sprinkler heads of lesser capacity or may be adapted for use with sprinkler heads having capacities of 1,500 gallons per minute or more when such heads become practical for use. Also, larger diameter lightweight hoses will eventually become available and such hoses can be incorporated into the teachings of the present invention. Such components would further increase the soil area that can be irrigated in each irrigation set and will create new possibilities for sprinkler irrigation of even larger land areas per set.

Laboratory testing indicates that water infiltration capacity of soils under continuous sprinkling will be increased about 31 percent if the sprinkler application rate is doubled and time duration is halved, i.e., 50 percent on and 50 percent off. The optimum cycle time duration of each sprinkler application will be dependent upon the type of soil and rate of application. In the laboratory experiments, beneficial cyclic alternation of air and water content of the soil pore spaces was noted in the bubbling up of air for a period of time after the start of each application of water. This entrained air was introduced into the soil through suction created by percolating water following the end of the prior application. It is reasonable to believe that not all of the entrained air would be displaced under these conditions; thus, the soil's agricultural potential may benefit from the cyclic "artificial respiration" technique of alternate periods of surface exposure to water and air.

From the foregoing, it appears to be advantageous that the cycle timing be set so that an interval of water application will end just prior to the occurrence of free water at the surface. This would, no doubt, vary with soil and crop conditions and perhaps with weather conditions and time of year. With the apparatus of the present invention, the cycle timing can be readily adjusted by adjustment of rate of flow of water to the mechanical power means of FIGS. 6 and 7 (the piston and cylinder assembly operated by valves 124 and 126, FIG. 6b) and by adjusting the operation of motor 170 (FIG. 8).

While the foregoing description of the system of the present invention has been made with respect to a 320-acre field, the system could also be used in other ways, such as for applying twice as much water to 120 acres in the same 24-day period or two-thirds as much water to 420 acres. Or, in a big field, several types of crops may be grown and different quantities of water applied to each by lengthening or shortening the duration of irrigation sets. Spacing between locations of lateral 20 can be greater or less than 440 feet, as shown. Also, while the cycling sequence of the heads has been described as heads 22, 26, 24 and 28, the sequence could be heads 22, 24, 26 and 28, if desired.

What is claimed is:

1. Sprinkler irrigation apparatus for irrigating a field comprising: a lateral for conveying water along a predetermined path; means mounting the lateral in a field for movement over the ground in a direction transversely of said path into any one of a plurality of operative positions along the length of a field to be irrigated; means coupled with said mounting means for moving the latter in said direction to thereby permit movement of the lateral successively into a number of said operative positions; a plurality of sprinkler heads secured to and in fluid communication with said lateral at spaced locations along the length thereof, said sprinkler heads adapted for sprinkling water onto the field; an actuatable valve for each sprinkler head, respectively, each valve being operable to control the flow of water to the respective sprinkler head and means coupled with the valves for successively actuating the same in accordance with a predetermined sequence with less than all of said valves being actuated at any given time when the lateral is in any one of said operative positions to thereby provide for intermittent sprinkling of respective areas of the field.

2. Apparatus as set forth in claim 1, wherein said actuating means is carried by said lateral and includes an actuator responsive to the water flow in said lateral, said valves being mechanically actuated and mechanically coupled to said actuator.

3. Apparatus as set forth in claim 1, wherein said actuating means includes a program device carried by the lateral, said device having a commutator ring provided with a movable contact, and a drive motor for operating said movable contact, said valves being electrically actuated and electronically coupled with said commutator ring.

4. Apparatus as set forth in claim 1, wherein is provided a water deflector assembly carried by the lateral adjacent to one of the sprinkler heads, said assembly being operable to deflect the water issuing from said one sprinkler head onto a predetermined portion of the field.

5. Apparatus as set forth in claim 1, wherein said lateral has a flexible hose at one end thereof for connecting the same to a source of water.

6. Apparatus as set forth in claim 5, wherein said hose has means thereon for emptying the source.

7. Apparatus as set forth in claim 1, wherein said lateral is spaced above the ground, and wherein is provided a retractable support coupled with said lateral and movable into and out of engagement with the ground to support the lateral as water flows therethrough.

8. Apparatus as set forth in claim 7, wherein said support includes a fluid actuated assembly coupled with said lateral and being responsive to the flow of water therethrough.

9. Apparatus as set forth in claim 1, wherein is included a number of elongated carrier units disposed in end-to-end relationship, each pair of adjacent carrier units being pivotally interconnected, said moving means including power structure coupled with said units for moving the same over the ground.

10. Apparatus as set forth in claim 9, wherein is provided a wheel assembly at each end of each carrier unit, said power structure including a reversible motor for each wheel assembly, respectively, the motor of each wheel assembly being operable independently of the motor of each other wheel assembly.

11. Sprinkler irrigation apparatus for irrigating a field comprising: a lateral for conveying water along a predetermined path; wheel means mounting the lateral above ground for movement in a direction transversely of said path into any one of a plurality of operative positions along the length of a field to be irrigated; means coupled with said wheel means for moving the latter to thereby permit movement of the lateral successively into a number of operative positions; a plurality of pipes in fluid communication with and extending transversely from said lateral at spaced locations along he length thereof; a sprinkler head for each pipe, respectively, the sprinkler heads being coupled to respective pipes for receiving water therefrom and being adapted for sprinkling water onto the field beneath the lateral; an actuatable valve for each pipe, respectively, each valve being coupled with the respective pipe for controlling the flow of water therethrough; and means coupled with the valves for successively actuating the same in accordance with a predetermined sequence with less than all of the valves being actuated at a given time to provide for intermittent sprinkling of respective areas of the field.

12. A sprinkler irrigation system for a field comprising: a water main adapted to be disposed in the field and to be coupled to a source of water under pressure, said main having a number of fluid outlets along the length thereof; a lateral normally disposed transversely of said main on one side thereof when the main is disposed in the field; means mounting the lateral for movement over the ground along a path generally parallel to the main and into and out of any one of a number of operative positions with respect thereto, there being a fluid outlet on the lateral for each operative position, respectively; means carried by the lateral for releasably coupling one end thereof to any one of said fluid outlets; means coupled with said mounting means for moving the lateral along said path relative to the main; a number of spaced sprinkler heads carried by and in fluid communication with said lateral and adapted for sprinkling water onto the field when the lateral is in any one of said operative positions; an actuatable valve for each sprinkler head, respectively, each valve being coupled with the respective sprinkler head for controlling the fluid flow therethrough; and means coupled with the valves and carried by the lateral for successively actuating the valves in accordance with a predetermined sequence with less than all of the valves being actuated at any given time to provide for intermittent sprinkling of respective areas of the field.

13. A system as set forth in claim 12, wherein said lateral is spaced from said main, and including a flexible hose coupled to said one end of the lateral for releasably connecting the same to any one of said fluid outlets.

14. A system as set forth in claim 12, wherein said main has a number of hydrants defining said fluid outlets thereof, each hydrant having a first outlet opening for coupling said lateral to the main and a second outlet opening for coupling a sprinkler head to the hydrant.

15. A system as set forth in claim 12, wherein said water main is adapted to be disposed at a central location in the field, said lateral being movable alternately on opposite sides of the main.

16. A system as set forth in claim 12, wherein said lateral is spaced outwardly from said main, there being a flexible hose for releasably interconnecting one end of the lateral with any one of the fluid outlets, and including a water deflector assembly carried by the lateral adjacent to the opposite end thereof, said assembly being disposed to deflect the water issuing from the adjacent sprinkler head onto a predetermined portion of the field adjacent to said opposite end of the lateral.

17. A system as set forth in claim 16, wherein said adjacent sprinkler head has a circular sprinkling pattern, said deflector assembly being operable to deflect the water directed into an arcuate portion of the pattern into a region of the field having an area less than the area of said arcuate portion.

18. A system as set forth in claim 12, wherein said actuating means includes an actuator carried by the lateral and being operated in response to the fluid flow in said lateral, each of said valves being mechanically actuated, said actuator having means coupling the same to each valve, respectively, said connecting means being operable in accordance with said sequence.

19. A system as set forth in claim 18, wherein said actuator includes a rotatable disc, said connecting means including an elongated member coupled with the disc adjacent to the outer periphery thereof, the members being movable about the central axis of the disc to control the operation of respective valves.

20. A system as set forth in claim 18, wherein said actuator includes a rotatable crankshaft having a pair of sections, one section being in a plane substantially perpendicular to the plane of the other section, said connecting means including a pair of elongated members coupled to and extending outwardly from respective crankshaft sections, said members being operably coupled with respective valves for mechanically actuating the same in response to the rotation of the crankshaft.

21. A system as set forth in claim 18, wherein said actuator includes a fluid piston and cylinder assembly having a pair of valves for controlling the flow of fluid into the respective ends of cylinder of the assembly, said valves being operable at different rates.

22. A system as set forth in claim 18, wherein said valves are electrically actuated, said actuating means including an electric switch for periodically and successively actuating the valves in accordance with sequence.

23. A system as set forth in claim 12, wherein said mounting means includes a number of elongated carrier units arranged in end-to-end relationship, each pair of adjacent carrier units being pivotally interconnected for relative movement about a generally horizontal axis, said lateral including a number of pipe sections, there being a pipe section for each carrier unit, respectively, there being a flexible hose interconnecting each pair of adjacent pipe sections, respectively.

24. A system as set forth in claim 23, wherein is provided a mid-span support for each carrier unit, respectively, each support being retractable and movable into engagement with the ground for supporting the carrier unit and thereby the corresponding pipe section of said lateral, each support being actuated in response to the fluid flow through the lateral.

25. A system as set forth in claim 23, wherein said lateral is provided with means for automatically draining the same with the fluid flow therethrough has ceased.

26. A system as set forth in claim 12, wherein said field is approximately 5,280 feet long and 2,640 feet wide, said water main being disposed substantially centrally between the long sides of the field and having twelve fluid outlets with each fluid outlet being spaced approximately 440 feet from the adjacent fluid outlets, said lateral being approximately 864 feet long and normally disposed centrally between said water main and an adjacent long side of the field, each sprinkler head having a fluid delivering capacity of approximately 1,000 gallons per minute with the sprinkling pattern of each head being circular and having a diameter of approximately 600 feet when the pressure of the fluid delivered to the head is approximately 130 psi.

27. Sprinkler irrigation apparatus for irrigating a field comprising:
a lateral for conveying water along a predetermined path;
means mounting the lateral above ground for movement into any one of a plurality of operative positions in the field to be irrigated;
means coupled with said mounting means for moving the latter in said direction to thereby permit movement of the lateral successively into a number of operative positions;
a number of sprinkler heads carried by and in fluid communication with said lateral at spaced locations along the length thereof;
the sprinkler heads being adapted for sprinkling water onto the field beneath the lateral;
an actuatable valve for each pipe, respectively, each valve being coupled with the respective pipe for controlling the flow of water therethrough;
means coupled with the valves for successively actuating the same in accordance with a predetermined sequence with less than all of said valves being actuated at a given time to provide for intermittent sprinkling of respective areas of the field; and
a flexible, self-emptying hose coupled to one end of the lateral and adapted to be connected to a source of water under pressure.

28. A method of irrigating a field by intermittently sprinkling the same comprising:
providing a primary fluid path at a first operative position in a field to be irrigated;
providing a plurality of secondary fluid paths in fluid communication with the primary path;
directing a flow of water along said primary path;
opening and closing said secondary paths in accordance with a predetermined sequence in which less than all of the second paths are open at any given time to thereby cause intermittent flow of water along each secondary path as water continues to flow along the primary path;
stopping the flow of water along the primary path;
moving the primary path transversely of its length into a second operative position spaced laterally from said first operative position;
directing a flow of water along said primary path when the latter is in said second operative position; and
opening and closing the secondary paths in accordance with said predetermined sequence.

29. A method as set forth in claim 28, wherein the step of directing a flow of water along said primary path includes placing the same in fluid communication with a water main.

30. A method as set forth in claim 28, wherein the opening and closing of the secondary paths are controlled from a location adjacent to said primary path.

31. A method as set forth in claim 28, wherein said primary path is spaced above the field, and wherein is included the steps of supporting said primary path from beneath as fluid flows along the same, and draining fluid from said path after the fluid flow has ceased.

32. A method as set forth in claim 31, wherein said supporting and draining steps are responsive to the fluid flow along said primary path.

33. A method as set forth in claim 28, wherein is included the step of deflecting the fluid flow along one of the secondary paths to cause the fluid to be directed onto a predetermined portion of the field.

34. A method as set forth in claim 28, wherein is included the step of controlling the flow of fluid along said secondary paths in response to the fluid flow along said primary path.

35. A method of irrigating a field by intermittently sprinkling the same comprising: providing a first fluid flow path having a number of fluid outlets; providing a second fluid flow path extending laterally from said first path; providing a number of third fluid flow paths in fluid communication with the second path at spaced locations along the same; coupling the second path to a first of the fluid outlets of the first path; directing a flow of fluid under pressure along said first path, whereby fluid will flow into and along said second path; opening and closing said third paths in accordance with a predetermined sequence in which less than all of the third paths are open at any given time to thereby cause intermittent flow of fluid along each secondary path as water continues to flow along the second path; stopping the flow of water from said first path to said second path; uncoupling the second path from said first fluid outlet; moving the second path relative to and longitudinally of said first path; coupling the second path to a second fluid outlet; directing a flow of water from the first path to the second path; and opening and closing the third paths in accordance with said predetermined sequence.

* * * * *